(12) United States Patent  
Baker et al.

(10) Patent No.: US 8,170,182 B2
(45) Date of Patent: May 1, 2012

(54) ENHANCED CALL TRACING

(75) Inventors: Steve Baker, Arvada, CO (US); Kurt Haserodt, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 360 days.

(21) Appl. No.: 12/543,961

(22) Filed: Aug. 19, 2009

(65) Prior Publication Data

US 2011/0044434 A1    Feb. 24, 2011

(51) Int. Cl.
*H04M 1/64* (2006.01)
*H04M 1/56* (2006.01)

(52) U.S. Cl. ................... 379/88.19; 379/142.03

(58) Field of Classification Search ............... 379/133, 379/142.03, 93.01; 370/352–356
See application file for complete search history.

(56) References Cited

U.S. PATENT DOCUMENTS

2009/0122794 A1* 5/2009 Wu et al. ............... 370/352
2010/0088421 A1* 4/2010 Przybysz et al. ........ 709/228

FOREIGN PATENT DOCUMENTS

EP     1389862      2/2004
WO   WO 2006/096383   9/2006

OTHER PUBLICATIONS

Background of the invention for the above captioned application (previously provided).
Extended European Search Report for European Patent Application No. 10172577.8, mailed Oct. 29, 2010.

* cited by examiner

*Primary Examiner* — Davetta W Goins
*Assistant Examiner* — Mohammad Islam
(74) *Attorney, Agent, or Firm* — Sheridan Ross P.C.

(57) ABSTRACT

Methods, devices, and systems are provided for employing an efficient call tracing algorithm. Messages may be filtered according to an initial filter criteria, then messages that meet the initial filter criteria are analyzed to develop a secondary filter criteria. The first and/or second filter criteria can then be applied to subsequently transmitted messages for a predetermined amount of time, most likely relating to the length of the call which met the first filter criteria.

21 Claims, 2 Drawing Sheets

ENHANCED CALL TRACING

FIELD OF THE INVENTION

The invention relates generally to communications and more specifically to call tracing.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Call tracing in traditional communication systems is relatively easy because a most messages transmitted during a communication are relevant to that communication (e.g., are content bearing messages). When SIP is used, however, many messages from a particular endpoint or IP address are not useful for that call. For example, SIP utilizes many messages that are not content bearing messages and are, therefore, not necessarily needed for call tracing purposes. Thus, there is no current solution for call tracing intelligently in a SIP environment.

Traditional call tracing solutions apply a single filter for identifying calls of interest that are subject to a call tracing mechanism. The filter criterion usually includes an originator identifier and a target identifier. For example, a call tracing filter criteria may indicate call tracing should occur for any calls from IP address 'A' to IP address 'B' or vice versa. The problem with using these traditional mechanisms in a SIP environment is that these simple filtering criteria can trigger call tracing for relatively unimportant or unwanted SIP messages, thereby unnecessarily occupying call tracing resources and call recording resources.

SUMMARY

It is thus one aspect of the present invention to provide an intelligent call tracing mechanism that is particularly well suited for use in a SIP environment. Embodiments of the present invention propose a multi-level filter criterion for communication session tracing. Initial filter criteria may be similar to prior art filter criteria in that it is caller and/or callee centric. For example, initial filter criteria may indicate that communication session tracing should occur for calls from address 'A' to address 'B' or domain 'X' to domain 'Y'. When a first message is found that meets initial filter criteria, a module analyzes the first message for certain types of call parameters or characteristics such as call ID and tag information. The call ID and tag information is then used to develop secondary filter criteria. This secondary filter criteria is used to filter any subsequently transmitted messages that may or may not necessarily meet the initial filter criteria.

One benefit provided by such a system configuration is that the initial criteria may not hold for the messages related to the call dialog that they establish. SIP "mutates" some of the message fields once the dialog is established. If the initial filter depends on those fields, the initial "triggering" filter would miss these messages. One aspect of the present invention is to capture the dialog created by the initial messages that the initial filter matched. To do so, embodiments of the present invention generate a secondary "dialog" or "call" filter dynamically/algorithmically to capture the in-dialog messages. The dialog or call filter will expire when the dialog expires, or when a filter-defined inactivity timeout occurs or when a terminal message count threshold is exceeded.

The latter message count threshold may be specific to the individual instance of the secondary "dialog" filter or it may be specific to the triggering filter and its spawned dialog filters or it may be global to the tracing application. Limit thresholds from any combination of this hierarchy may be enforced.

The initial filter criteria may remain active such that other dialogs can be traced either contemporaneously or sequentially. The initial filter criteria is not needed to support or maintain the context based secondary filter however there may remain a residual message limit counter shared among the secondary filters it spawned.

Also, after the secondary filter criteria is created, this filter criteria may be applied before the initial filter criteria is applied. This allows dialog related dropped messages to be included in the call tracing criteria (secondary), thereby allowing dropped dialogs to be fully traced. This is useful because malicious calls often contain messages that are corrupted and discarded by the communications server. Both the trigger and call filter can be applied to dropped messages thereby enabling capture and analysis of the complete malicious call message sequence. Accordingly, it is another aspect of the present invention to allow dropped messages to be logged in relation to the trace filter that is associated with the secondary filter without relying on the message also meeting the initial filter criteria.

It should be appreciated by those skilled in the art that embodiments of the present invention are not just limited to calls but can be utilized in any type of communications session. Adaptive, contextual tracing may extend to any purpose that involves a communications session. For example, session based text messaging or security camera streaming may involve the setup of a session/dialog by application user agents, which may be traced using this adaptive technology.

In accordance with at least some embodiments of the present invention a method is provided that generally comprises:

receiving a subsequent message;

applying secondary filter criteria to the second message to determine if the second message is to be subjected to a predetermined process, wherein the secondary filter criteria is developed as a result of previously analyzing properties of a first message and determining that the first message is to be subjected to the predetermined process;

determining that the second message meets the secondary filter criteria; and subjecting the second message to the predetermined process.

As used herein the term "transaction" refers to an exchange of information between two endpoints through optional intermediary proxies. This is typically accomplished by exchanging a multiplicity of related messages some of which are not end-to-end.

As used herein the term "dialog" or "session" is understood to refer to a communications context that is established by a transaction and optionally updated and/or terminated by one. A dialog may optionally terminate by timeout due to inactivity (a lack of transactions).

As used herein the term "initial transaction" refers to a transaction that establishes a dialog.

As used herein the term "update transaction" refers to a mid-dialog transaction associated with that dialog that neither establishes nor terminates the dialog.

As used herein the term "freestanding transaction" refers to a transaction that is not associated with a dialog and neither establishes or terminates one.

As used herein the term "terminating transaction" refers to a transaction that terminates the dialog.

The terms "trigger filter" and/or "initial filter" may be used interchangeably to refer to a first application filter or set of filter rules. Such a filter contains attributes that are applied to the contents of some or all of the messages in an initial transaction or a freestanding transaction. If the match succeeds using the trigger filter or initial filter, the triggering message will be traced followed by all other messages in the associated transaction. If a dialog is established, all messages associated with update and terminating transactions will be traced by a dialog filter.

The terms "dialog filter", "call filter", and/or "secondary filter" may also be used interchangeably to refer to any type of filter that is created by the trigger filter logic to filter all messages associated with a dialog. The dialog filter's match attributes are comprised of any combination of: 1) attributes that are taken from the matched message or messages, 2) attributes copied from the trigger filter that may or may not have been applied in by that filter in matching the initial message or messages in the initial transaction, 3) attributes computed from external sources such as time or day, etc., and 4) attributes computed from a combination of 1), 2), 3) and 4). Additionally, the dialog filter may match the remaining messages of the initial transaction if the trigger filter is unable to do so.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to trace calls or invoke similar applications.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
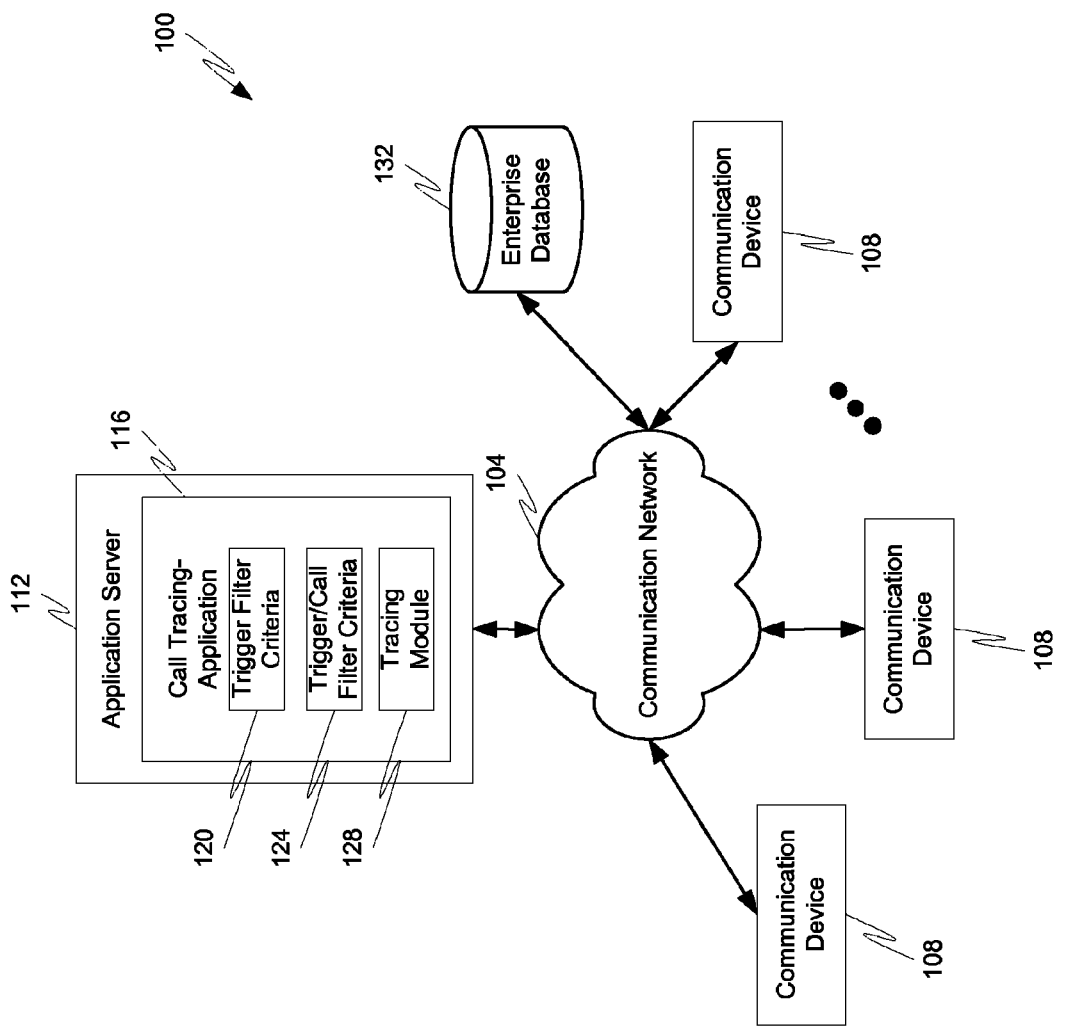
FIG. 1 is a block diagram depicting a communication system in accordance with at least some embodiments of the present invention.

With reference initially to FIG. 1, an exemplary communication system 100 will be described in accordance with at least some embodiments of the present invention. More specifically, the communication system 100 includes a communication network 104 adapted to interconnect one or more communication devices 108 with an application server 112.

The trusted communication network 104 may be any type of known communication medium or collection of communication mediums and may use any type of protocols to transport messages between endpoints. The communication network 104 may also include wired and/or wireless communication technologies. The Internet is an example of a communication network 104 that constitutes and IP network consisting of many computers and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, any type of enterprise network, and any other type of packet-switched or circuit-switched network known in the art.

The communication devices 108 may be any type of known communication or processing device such as a personal computer, laptop, Personal Digital Assistant (PDA), cellular phone, smart phone, telephone, analog phone, DCP phone, or combinations thereof. A single communication device 108 may be controlled by or be associated with a single user or may be adapted for use by many users (e.g., an enterprise communication device that allows any enterprise user to utilize the communication device upon presentation of a valid user name and password).

Two or more of the communication devices 108 may be associated with the same user. In other words, two communication devices 108 may belong to a single user and may correspond to different types of communication devices. As one example, the user may have four communication devices 108 each of which correspond to a personal phone, a work phone, a personal computer, and an email retrieval device, respectively, of a single user. Alternatively, each of the communication devices 108 may be owned and operated by (e.g., associated with) a different user.

In general, the communication devices 108 may be adapted to support video, audio, text, and/or data communications with other communication devices 108. The type of medium used by one communication devices 108 to communicate with another communication device 108 may depend upon the communication applications available on one or both communication devices 108.

The application server 112 is adapted to provide applications and functions to the communication devices 108, particularly during communication sessions with other communication devices 108. In accordance with at least some embodiments of the present invention, one or more applications stored on the application server 112 may comprise a SIP application for providing features and functions to a SIP call or SIP communication session. Such features and functions may be provided by processing one or more messages which are a part of the communication session. One example of an application that may be stored on the application server 112 includes a call tracing application 116, which, when executed by a processor, is adapted to execute call tracing functions on messages received by the application server 112.

In accordance with at least some embodiments of the present invention, the call tracing application 116 provides a particular function or set of functions associated with call tracing such as message identification, recording, and storage. The call tracing application 116 may comprise one or more modules 128 to help the application 116 perform such tasks.

In accordance with at least some embodiments of the present invention, the call tracing application 116 may also comprise two different sets of filter criteria. The first set of filter criteria may correspond to trigger filter criteria 120 used to identify a first message in a communication session which may be subjected to the call tracing process. The second set of filter criteria may correspond to dialog or call filter criteria 124. The secondary filter criteria 124 may be developed to more accurately and intelligently determine whether messages transmitted in a communication session, particularly one using both content-bearing and non-content bearing messages, should be subjected to the call tracing process.

In accordance with at least some embodiments of the present invention, the dialog or call filter criteria 124 is developed as a result of previously analyzing properties of a first message and determining that the first message is to be subjected to the call tracing process. In other words, the call tracing application 116 may be adapted to receive messages during a communication session, determine that one or more of the messages from the communication session satisfies the trigger filter criteria 120, and subject that message to the call tracing process by invoking the tracing module 128. Furthermore, the message satisfying the trigger filter criteria 120 may be analyzed by the tracing module 128, or some other module in the call tracing application 116, to determine the dialog or call filter criteria 124. As an example, the tracing module 128 analyzes the message meeting the trigger filter criteria 120 for certain types of call parameters or characteristics such as call ID and tag information. The call ID (which may simply be an identifier that includes the time the call started along with a combination of the caller and/or callee or which may be a hash function produced by one or more of call start time, caller, callee or which may be a randomly assigned call identifier) and tag information (which may be stored as a tag in one or more message headers) is then used to develop the dialog or call filter criteria 124.

It should be noted that in SIP a tag is associated with the caller and a different tag is associated with the callee. These tags should be thought of as an application identifier (there may be more than one application at the endpoint, hence more than on tag there). Tags are required in SIP but may not exist in other protocols. It is nothing more than a component in set of information gleaned from the initial messages that establish a session. This information is used to provide a protocol-specific filter to capture the session. In the case of SIP, there will be tags in all sessions including up to 2051090 tags that a party will like have no interest in tracing. Such tags are ignored.

This dialog or call filter criteria 124 is used to filter any subsequently transmitted messages that may or may not necessarily meet the trigger filter criteria 120. Therefore, if the initial trigger is disabled, some messages meeting the trigger filter criteria 120 will not be traced if they do not meet the dialog or call filter criteria[SAB: This is only true if the initial "trigger" filter is disabled. 124. This helps limit call tracing to relevant messages and preserves communication session tracing resources (e.g., processors, memory, etc.) for use only when desired and relevant. If, however, the initial trigger filter criteria continues to be enabled, then a new dialog or call filter 124 will be spawned. As can be appreciated by one skilled in the art, the results of call tracing may be stored in the application server 112 itself or in a remote database, such as an enterprise database 132. The enterprise database 132 may also comprise information related to users (not necessarily limited to enterprise users) and their communication history.

Figure 2:
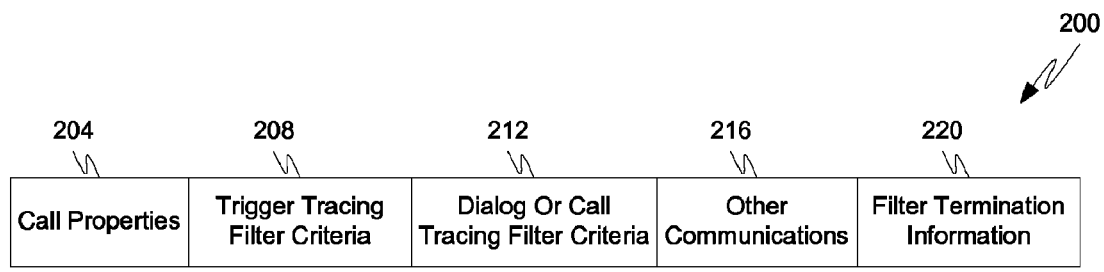
FIG. 2 is a block diagram depicting a data structure used in accordance with at least some embodiments of the present invention.

Referring now to FIG. 2, an exemplary data structure 200 will be described in accordance with at least some embodiments of the present invention. The data structure 200 may comprise a number of fields for storing information relevant to executing a call tracing process. Accordingly, the data structure 200 may be stored on the application server 112 and/or in the enterprise database 132. The data structure 200 may also comprise information related to results of executing the call tracing process or pointers to memory locations where recorded content is stored. More specifically, the data structure 200 may comprise a call properties field 204, a trigger tracing filter criteria field 208, a dialog or call tracing filter criteria 212, a related communications field 216, and a filter termination information field 220.

The call properties field 204 may contain information related to properties of a call or communication session. The call properties field 204 may be populated by analyzing a message that satisfied the initial filter criteria 120. As an example, the call properties field 204 may comprise identification information for parties to a communication session as well as a tag identifier which can be compared to tags of subsequently transmitted messages to determine if such messages are to have the call tracing process applied thereto.

The trigger tracing filter criteria field 208 may comprise the trigger filter criteria 120 which defines, for example, parties or communication devices (usually by communication device identifiers or port addresses) which are to have the call tracing process applied thereto. The information in the trigger tracing filter criteria field 208 is typically used to first determine whether a communication session is to have the call tracing process applied thereto.

The dialog or call tracing filter criteria field 212, on the other hand, has information that is used to subsequently determine whether messages in a communication session satisfying the trigger filter criteria 120 should have the call tracing process applied thereto. Accordingly, the dialog or call tracing criteria field 212 may comprise the dialog or call filter criteria 124 along with other relevant information used to determine whether a communication session (which may alternatively be referred to as a dialog) needs to have the trigger filter criteria 120 applied thereto.

The other communication field 216 may comprise information identifying relationships between various communication sessions. For example, if a call is dropped and subsequently re-initiated between the same parties, the fact that the dropped call is related to the subsequent call may be maintained in the other communications field 216. This is especially useful when the two calls are related to each other as is often the case with multi-party conferencing.

The filter termination information field 220 may comprise data used to determine when the secondary filter criteria 124 is to be discarded and/or no longer used. More specifically, once a communication session is being traced by the tracing module 128, it is generally advantageous to continue tracing the communication session for its entirety. In this case, the secondary filter criteria 124 may be discarded or ignored after the communication session has ended. Alternatively, it may be advantageous to maintain the secondary filter criteria 124 for a predetermined amount of time after a communication session has ended, particularly to address the dropped call situation. In this embodiment, the filter termination information field 220 may define that the secondary filter criteria 124 should be applied for a predetermined amount of time (e.g., 5 minutes, 10 minutes, a day, etc.) after the communication session being traced has ended. It should also be appreciated that the filter termination information field 220 may define that the secondary filter criteria 124 should be applied for a predetermined amount of time after the communication session starts. Basing the termination information on the beginning of the communication session may or may not be beneficial depending upon the intended application and use of the call tracing process, particularly because the communication session may not end before the secondary filter criteria 124 is dropped. Of course, if the communication session continues after the secondary filter criteria 124 has terminated, the secondary filter criteria 124 may be re-instituted or re-created by analyzing another message of the communication session under the initial filter criteria 120 to repopulate the call properties field 204.

Figure 3:
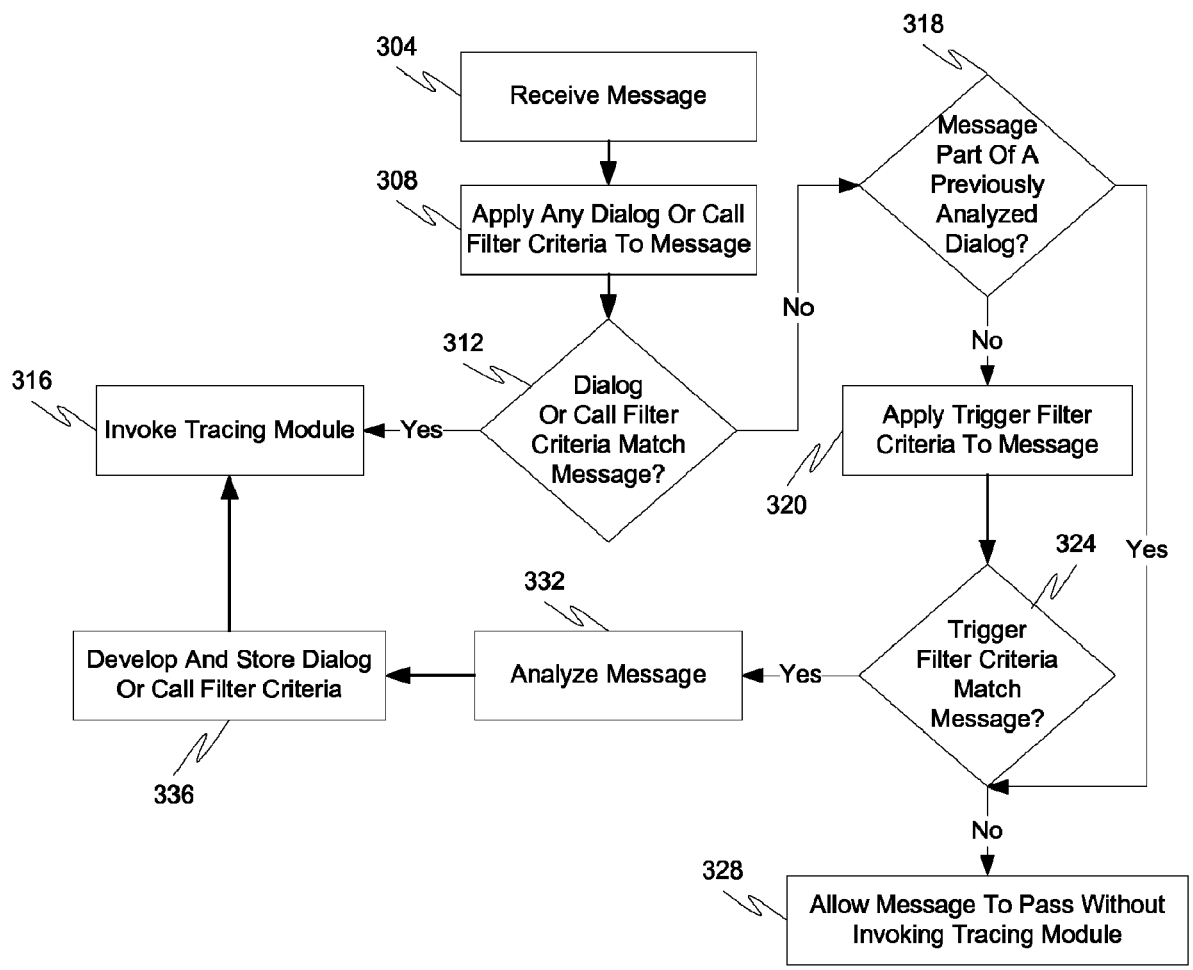
FIG. 3 is a flow diagram depicting a method of processing a message in accordance with at least some embodiments of the present invention.

Referring now to FIG. 3, an exemplary method of message processing will be described in accordance with at least some embodiments of the present invention. The method is initiated when a message is received at the application server 112 (step 304). The received message is then analyzed based on the existing dialog or call filter criteria 124 (step 308) to determine if the message is to be subjected to the call tracing process (step 312). More specifically, if the message is a part of a communication session or dialog that is being traced by the tracing module 128, then the dialog or call filter criteria 124 may define that certain calls of that dialog should be processed by the tracing module 128. As noted above, the dialog or call filter criteria 124 may be generated based on characteristics of previously received messages which are a part of the same dialog as the currently received message.

If it is determined that properties of the call match the dialog or call filter criteria 124 and the message is to be subjected to call tracing, then the method continues by invoking the call tracing module 128 (step 316). If the message did not satisfy the dialog or call filter criteria 124, then the method will continue by determining whether the message is a part of a previously analyzed dialog (step 318). In this step, the application 116 may analyze its message processing history to determine if the message belongs to any other dialog which has already been analyzed but was not subjected to the call tracing process. This determination is made in an attempt to limit the amount of processing resources used, particularly in an attempt to avoid re-determining that a dialog should not be traced. If this inquiry is answered affirmatively, then the method continues by allowing the message to be processed by the application server 112 without invoking the tracing module 128 (step 328).

If, on the other hand, the received message is either a first message of a dialog (e.g., a SIP INVITE message or similar type of invitation to initiate a communication session) or if the message is the first content-bearing message of a dialog, then the message is analyzed based on the trigger filter criteria 120 (step 320) to determine if the message and its dialog is to be subjected to the call tracing process (step 324). If the answer to this inquiry is negative (i.e., the message does not satisfy the initial filter criteria 120), then the method continues to step 328.

If the received message satisfies the initial filter criteria 120, then the method will continue by analyzing the message to define the dialog or call filter criteria 124 which can be used to filter subsequent messages of the same dialog (step 332). The information retrieved from the message and used to develop the dialog or call filter criteria 124 can include at least one of call ID and tag information contained in the body and/or headers of the message. Once the appropriate dialog or call filter criteria 124 has been developed, the method continues by storing the secondary filter criteria 124 in the data structure 200 (step 336). At the same time or shortly thereafter the tracing module 128 is invoked to execute the call tracing functions on the received message (step 316).

It should be noted that this process can be repeated an infinite number of times. Thus, embodiments of the present invention are not limited to a first and second set or layer of filtering criteria. Rather, embodiments of the present invention contemplate tertiary levels of filters and beyond. Embodiments of the present invention contemplate the creation of at least a secondary set of filter criteria (for dialog matching) and a tertiary set of filter criteria (for call matching) based on having a single message match the trigger filter criteria. As noted above, additional numbers of filter criterion are within the scope of the present invention. As an example, in certain types of calls (e.g. conferences) that can be made up of several (even hundreds of) dialogs, embodiments of the present invention can be utilized to create new filter matching patterns or rules as each party was added to the conference.

The messages for which the dialog filter is intended often have signatures that do not match the criteria of the trigger filter. This is especially true of protocols like SIP where contact information is exchanged and replaces that which was used to establish the dialog. In accordance with at least some embodiments of the present invention, once a match is made with a trigger filter, the trigger filter may or may not stay "armed" or active. If it does, then new, independent dialogs filters may be created to track messages associated with the new dialogs.

New dialogs which are selected for tracing due to the fact that they have matched the trigger filter may have lifetimes that overlap other dialogs matched by the same trigger filter.

In cases where trigger filter attributes selected by the operator do not apply to mutate-able fields of dialog messages, it is possible that a dialog message will match both the trigger filter and the dialog filter. In such cases, the dialog filter governs and no duplicative dialog filters will be created.

In cases where a trigger filter is armed after a dialog has been established, and the dialog messages match the trigger filter, a dialog filter may be constructed and the remainder of the dialog will be traced.

In accordance with at least some embodiments of the present invention, there are cases where a communications server may impose itself on a call to act as a silent party. This is sometimes referred to as a back-to-back agent. Often conference calls are actually comprised of several two party calls with the conference server acting as the common party to each. Whenever a "call" is so partitioned into multiple dialogs at the signaling level, it is desirable to trace and associate each of these associated calls (troubleshooting, lawful intercept, etc.). Embodiments of the present invention provide methods to support compound calls by several methods: 1) the trigger filter can be designed to recognize establishment of any of the individual low-level dialogs and spawn individual dialog filters for each, or 2) the trigger filter can be designed to recognize establishment of any of the individual low-level dialogs and on the first such match, spawn a dialog filter that is broad enough to match this and any of the subsequent multiple dialogs that may comprise the multi-party call, or 3) the first spawned dialog filter can recognize the extension of the call to include additional parties and can self-modify its match criteria to extend to each related dialog at the time they are created, or 4) the first spawned dialog filter can recognize the extension of the call to include additional parties and can itself spawn an additional dialog filter to match each related dialog as they are created. The latter two methods are particularly useful when the initial trigger filter cannot monitor call extension because it doesn't filter for the in-dialog messages.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for generating message filtering criteria based on analyzing messages which met another set of filtering criteria. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving a first message at an application server, the first message including initial filter criteria;

analyzing properties of the first message with the initial filter criteria at the application server, wherein the initial filter criteria indicates that the first message is to be subjected to a call tracing application if the first message is at least one of going tod coan minfrom a predetermined address, domain or user;

determining that the first message is at least one of going to and coming from the predetermined address, domain or user;

based on determining that the first message is at least one of going to and coming from the predetermined address, domain or user, initiating an analysis of the first message to develop secondary filter criteria;

developing the secondary filter criteria based on results from the previously analyzed first message;

receiving a second message at the application server, the first and second message being part of a common Session Initiation Protocol (SIP) dialog;

applying the secondary filter criteria to the second message at the application server, wherein the secondary filter criteria is developed to determine if the second message is to be subjected to the call tracing application;

determining that the second message meets the secondary filter criteria; and subjecting the second message to the call tracing application.

2. The method of claim 1, wherein a third message which does not meet the secondary filter criteria is not subjected to the call tracing application.

3. The method of claim 2, wherein the third message and the second message are a part of at least one of the common dialog and a common call.

4. The method of claim 3, wherein the second message is a content-bearing message and the third message is a non-content-bearing message.

5. The method of claim 3, wherein the second message and third message are being transmitted between common endpoints.

6. The method of claim 1, wherein at least one of call ID and tag information of the first message is used to develop the secondary filter criteria.

7. The method of claim 1, further comprising:
based on determining that the first message is at least one of going to and coming from the predetermined address, initiating an analysis of the first message to develop a tertiary filter criteria.

8. The method of claim 1, wherein the call tracing application comprises at least one function associated with call tracing such as message identification, recording, and storage.

9. The method of claim 8, wherein a payload of the second message comprises one or more of a voice message, a video message, and a text message.

10. An application server, comprising:
memory adapted to store instructions that include:
an application adapted to, when executed, submit messages to a call tracing application, the application including initial filter criteria and secondary filter criteria, wherein the application analyzes properties of a first message with the initial filter criteria, wherein the initial filter criteria indicates that the first message is to be subjected to the call tracing application if the first message is at least one of going to and coming from a predetermined address, domain or user, determine that the first message is at least one of going to and coming from the predetermined address, domain or user, wherein the application develops secondary filter criteria based on results from previously analyzing the properties of the first message and determining that the first message is to be subjected to the call tracing application, wherein the application applies the secondary filter criteria to a second message received by the application to determine if the second message is to be subjected to the call tracing application, the first and second messages being part of a common Session Initiation Protocol (SIP) dialog; and
a processor operable to execute the application.

11. The server of claim 10, wherein a third message received at the application which does not meet the secondary filter criteria is not subjected to the predetermined process.

12. The server of claim 11, wherein the third message and the second message are a part of at least one of the common dialog and a common call.

13. The server of claim 12, wherein the second message is a content-bearing SIP message and the third message is a non-content-bearing SIP message.

14. The server of claim 12, wherein the second message and third message are being transmitted between common endpoints.

15. The server of claim 10, wherein at least one of call ID and tag information of the first message is used to develop the secondary filter criteria.

16. The server of claim 10, wherein the application is further operable to, based on determining that the first message is at least one of going to and coming from the predetermined address, initiate an analysis of the first message to develop a tertiary filter criteria.

17. The server of claim 10, wherein the call tracing application comprises at least one function associated with call tracing such as message identification, recording, and storage.

18. The server of claim 10, wherein a payload of the second message comprises one or more of a voice message, a video message, and a text message.

19. A non-transitory computer readable information storage medium having stored thereon computer executable instructions that, when executed by a processor, cause the processor to execute a method comprising:
receiving a first message at an application server, the first message including initial filter criteria;
analyzing properties of the first message with the initial filter criteria at the application server, wherein the initial filter criteria indicates that the first message is to be subjected to a call tracing application if the first message is at least one of going to and coming from a predetermined address, domain or user;
determining that the first message is at least one of going to and coming from the predetermined address, domain or user;
based on determining that the first message is at least one of going to and coming from the predetermined address, domain or user, initiating an analysis of the first message to develop secondary filter criteria;
developing the secondary filter criteria based on results from the previously analyzed first message;
receiving a second message at the application server, the first and second message being part of a common Session Initiation Protocol (SIP) dialog;
applying the secondary filter criteria to the second message at the application server, wherein the secondary filter criteria is developed to determine if the second message is to be subjected to the call tracing application;
determining that the second message meets the secondary filter criteria; and
subjecting the second message to the call tracing application.

20. The non-transitory storage medium of claim 19, wherein a third message received at the processor which does not meet the secondary filter criteria is not subjected to the predetermined process, wherein the third message and the second message are a part of the common dialog, and wherein the second message is a content-bearing SIP message and the third message is a non-content-bearing SIP message.

21. The non-transitory storage medium of claim 19, wherein at least one of call ID and tag information of the first message is used to develop at least one of the secondary filter criteria and a tertiary filter criteria.

* * * * *

UNITED STATES PATENT AND TRADEMARK OFFICE
CERTIFICATE OF CORRECTION

| | | |
|---|---|---|
| PATENT NO. | : 8,170,182 B2 | |
| APPLICATION NO. | : 12/543961 | |
| DATED | : May 1, 2012 | |
| INVENTOR(S) | : Steve Baker and Kurt Haserodt | |

It is certified that error appears in the above-identified patent and that said Letters Patent is hereby corrected as shown below:

At Column 11, line 5, please delete "tod coan minfrom" and replace with --to and coming from-- therein.

Signed and Sealed this
Sixth Day of November, 2012

David J. Kappos
*Director of the United States Patent and Trademark Office*